US008842021B2

(12) United States Patent
Behm et al.

(10) Patent No.: US 8,842,021 B2
(45) Date of Patent: Sep. 23, 2014

(54) METHODS AND SYSTEMS FOR EARLY WARNING DETECTION OF EMERGENCY VEHICLES

(75) Inventors: Gary W. Behm, West Henrietta, NY (US); William B. Huber, Rye, NY (US); Alfred J. Noll, Poughkeepsie, NY (US); Raul A. Pelaez, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 13/154,666

(22) Filed: Jun. 7, 2011

(65) Prior Publication Data
US 2012/0313792 A1 Dec. 13, 2012

(51) Int. Cl.
*G08G 1/00* (2006.01)
*G08G 1/16* (2006.01)
*G08G 1/0965* (2006.01)
*G08G 1/0969* (2006.01)
*G08G 1/0962* (2006.01)
*G01C 21/26* (2006.01)

(52) U.S. Cl.
CPC ............ *G08G 1/0965* (2013.01); *G08G 1/0969* (2013.01); *G01C 21/26* (2013.01); *G08G 1/00* (2013.01); *G08G 1/0962* (2013.01)
USPC ...... 340/902; 340/903; 340/988; 340/426.16; 701/301; 701/414

(58) Field of Classification Search
CPC ..... G08G 1/0965; G08G 1/00; G08G 1/0962; G08G 1/0969; G01C 21/26
USPC ............ 340/902, 903, 988, 539.17, 906, 539, 340/905, 539.21, 539.1, 435, 426.16, 340/426.19; 701/213, 219, 454, 301, 93, 701/457, 414, 422; 342/357.07, 357.21, 342/455
See application file for complete search history.

(56) References Cited

U.S. PATENT DOCUMENTS

| 6,275,773 | B1 |   | 8/2001  | Lemelson et al.              |
|-----------|----|---|---------|------------------------------|
| 6,326,903 | B1 | * | 12/2001 | Gross et al. .......... 340/988 |
| 6,339,382 | B1 | * | 1/2002  | Arbinger et al. ........ 340/903 |
| 6,529,831 | B1 | * | 3/2003  | Smith et al. ........... 701/301 |
| 6,614,362 | B2 | * | 9/2003  | Siegel ................ 340/902 |
| 6,700,504 | B1 | * | 3/2004  | Aslandogan et al. ...... 340/901 |
| 6,895,332 | B2 | * | 5/2005  | King et al. ............ 701/457 |
| 6,958,707 | B1 | * | 10/2005 | Siegel ................ 340/902 |
| 7,099,774 | B2 | * | 8/2006  | King et al. ............ 701/454 |
| 7,099,776 | B2 | * | 8/2006  | King et al. ............ 701/454 |
| 7,271,736 | B2 | * | 9/2007  | Siegel et al. .......... 340/902 |
| 7,663,504 | B2 | * | 2/2010  | Votaw et al. .......... 340/902 |

(Continued)

OTHER PUBLICATIONS

"In-Vehicle Safety Advisory and Warning System" (IVSAWS), vol. I, Exec. Summary, US DOT, Pub #FHWA-RD-94-061, Mar. 1996, 179 pages.

(Continued)

*Primary Examiner* — Hoi Lau
(74) *Attorney, Agent, or Firm* — William Steinberg; Roberts Mlotkowski Safran & Cole, P.C.

(57) ABSTRACT

A system and method for warning of emergency vehicles includes a computing device that receives location data from a transmitter associated with a first vehicle based on a warning system of the first vehicle being activated. The computing device transmits vehicle notification data to a second vehicle based on the location data.

19 Claims, 7 Drawing Sheets

(56) References Cited

U.S. PATENT DOCUMENTS

| | | | |
|---|---|---|---|
| 8,258,979 B2* | 9/2012 | Lemmons et al. | 340/901 |
| 8,350,721 B2* | 1/2013 | Carr | 340/903 |
| 2001/0038344 A1* | 11/2001 | Garcia | 340/902 |
| 2002/0102961 A1* | 8/2002 | Gibbons et al. | 455/404 |
| 2003/0043056 A1* | 3/2003 | Siegel | 340/902 |
| 2003/0141990 A1* | 7/2003 | Coon | 340/902 |
| 2004/0143390 A1* | 7/2004 | King et al. | 701/213 |
| 2004/0143391 A1* | 7/2004 | King et al. | 701/213 |
| 2004/0246144 A1* | 12/2004 | Siegel et al. | 340/902 |
| 2005/0104745 A1* | 5/2005 | Bachelder et al. | 340/906 |
| 2005/0192746 A1* | 9/2005 | King et al. | 701/213 |
| 2005/0239436 A1 | 10/2005 | Bell et al. | |
| 2006/0261977 A1 | 11/2006 | Bachelder | |
| 2007/0043502 A1* | 2/2007 | Mudalige et al. | 701/207 |
| 2007/0132608 A1* | 6/2007 | Votaw et al. | 340/903 |
| 2007/0159354 A1* | 7/2007 | Rosenberg | 340/902 |
| 2008/0316055 A1* | 12/2008 | Bachelder et al. | 340/906 |
| 2009/0119014 A1* | 5/2009 | Caplan | 701/213 |
| 2010/0250111 A1 | 9/2010 | Gutierrez et al. | |
| 2010/0280751 A1* | 11/2010 | Breed | 701/207 |
| 2011/0018736 A1* | 1/2011 | Carr | 340/902 |
| 2011/0221611 A1* | 9/2011 | Lemmons et al. | 340/902 |
| 2012/0176254 A1* | 7/2012 | Imanaga et al. | 340/902 |
| 2012/0313792 A1* | 12/2012 | Behm et al. | 340/902 |

OTHER PUBLICATIONS

"In-Vehicle Safety Advisory and Warning System," (IVSAWS), vol. II, Final Report, US DOT, Pub# FHWA-RD-94-190, Mar. 1996, 269 pages.

Smelcer, et al., "Method for Enhancement of Vehicle Collision Avoidance Systems by Translation of Events to Alternate Human Senses PF2118NA", IPCOM 000004744D, Apr. 26, 2001, 3 pages.

Anonymous, "Method for Sound Classification and "Noise" Reduction in an Augmented Reality Environment", IPCOM 000199422, Sep. 2, 2010, 2 pages.

Quinlan, "New 'Move Over' law takes effect Jan. 1", http://www.brightonpittsfordpost.com/feature/x105401604/New-Move-Over-law-takes-effect-Jan-1, BrightonPittsfordPost.com, Sep. 24, 2010, 2 pages.

"Location-based service", http://en.wikipedia.org/wiki/Location-based_service, Wikipedia, retrieved May 15, 2011, 7 pages.

* cited by examiner

METHODS AND SYSTEMS FOR EARLY WARNING DETECTION OF EMERGENCY VEHICLES

TECHNICAL FIELD

The present invention generally relates to avoiding vehicle collisions, and more particularly, to methods and systems for early warning detection of oncoming emergency vehicles.

BACKGROUND

Emergency vehicles such as fire trucks, police cars, ambulances and rescue vehicles, speeding toward a destination, pose a potential collision hazard to other motorists. Although emergency vehicles typically have siren and/or emergency lights and lights to warn of their approach, these warning devices are of limited effectiveness. Deaf and hard of hearing drivers in particular, e.g., those who have hearing loss, hearing disabilities, hearing impairment, etc., face increased risks from unseen approaching emergency vehicles.

Different types of devices have been developed that provide drivers an auditory signal or a flashing light about the surrounding environment. It is difficult, however, for the deaf and hard of hearing person to utilize these conventional devices. For example, an auditory alert does not help a deaf person who does not have the capability of hearing the audible device. Moreover, a flashing light may indicate the proximity of an emergency vehicle, but does not indicate directionality of approaching emergency vehicles. These methods do not provide a sense of where the emergency vehicles are located. Unfortunately, as a result, there have been instances in which deaf drivers have sustained serious injury from accidental collisions with emergency vehicles.

SUMMARY

In a first aspect of the invention, there is a system for warning of emergency vehicles. The system includes a computing device that receives location data from a transmitter associated with a first vehicle based on a warning system of the first vehicle being activated. The computing device transmits vehicle notification data to a second vehicle based on the location data.

In another aspect of the invention, there is a transmitter for warning of emergency vehicles. The transmitter includes a wireless communication device associated with an emergency vehicle. The wireless communication device transmits location data and type data to a location based services (LBS) component while at least one of a siren and emergency light of the emergency vehicle is activated.

In an additional aspect of the invention, there is a method of warning of emergency vehicles. The method includes receiving location data and type data from an emergency vehicle based on at least one of a siren and emergency light of the emergency vehicle being activated. The method also includes transmitting emergency vehicle notification data to a vehicle based on the receiving the location data and type data. The receiving and the transmitting are performed using a computing device.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to avoiding vehicle collisions, and more particularly, to methods and systems for early warning detection of oncoming emergency vehicles. According to aspects of the invention, a navigation system of a vehicle is structured and arranged to display the location of emergency vehicles with respect to the location of the vehicle comprising the navigation system. In this manner, implementations of the invention provide methods and systems for a driver of a vehicle to know exactly where emergency vehicles are with respect to the location of the driver by utilizing an early warning notification feature integrated with a navigation system of the driver's vehicle. Implementations of the invention are particularly useful for deaf and hard of hearing drivers, since these drivers typically cannot detect the activated siren and/or emergency lights of an emergency vehicle.

Figure 1:
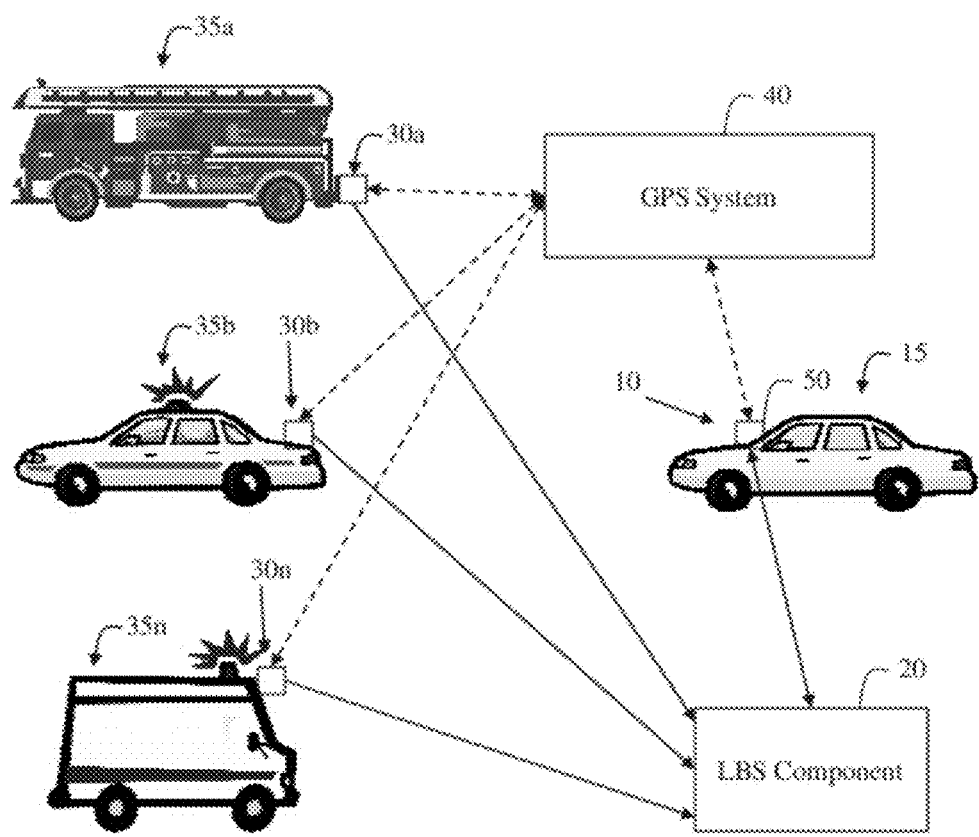
FIG. 1 shows an illustrative system in accordance with aspects of the invention.

FIG. 1 shows an illustrative system in accordance with aspects of the invention. In embodiments, the system comprises a navigation system 10 associated with a vehicle 15, a location based service (LBS) component 20, and at least one emergency vehicle signal transmitter 30a, 30b, ... 30n associated with at least one respective emergency vehicle 35a, 35b, ..., 35n, collectively referred to as a transmitter 30 and emergency vehicle 35. In implementations of the invention, the LBS component 20 receives location information (e.g., longitude, latitude, direction of travel, etc.) from the transmitter 30 of the emergency vehicle 35 while the warning system (e.g., siren and/or emergency lights and/or emergency lights) of the emergency vehicle 35 is activated (e.g., when the siren and/or emergency lights and/or emergency lights are on). The LBS component 20 may also receive an indication of the type of emergency vehicle 35 (e.g., fire, police, ambulance, etc.) from the transmitter 30. The LBS component 20 may also receive an identifier of emergency vehicle 35 (e.g., an ID number, etc.) from the transmitter 30. The LBS component 20 transmits the location information (and emergency vehicle type and/or emergency vehicle identifier, if known) to the navigation system 10 of the vehicle 15, and the navigation system 10 displays the location of the emergency vehicle 35 on a display (e.g., street map) relative to the location of the vehicle 15. In this manner, an occupant of the vehicle 15 is made aware of the location of the emergency vehicle 35 relative to the vehicle 15.

In accordance with aspects of the invention, respective locations (e.g., longitude and latitude) of the emergency vehicle 35 and the vehicle 15 are determined using a global positioning system (GPS) 40. The GPS 40 may also determine at least one of direction of travel and rate of travel for at least one of the emergency vehicle 35 and the vehicle 15. Conventional GPS techniques may be used in determining location, direction of travel, and rate of travel, such that further explanation is not believed necessary.

In embodiments, the navigation system 10 comprises a GPS-based navigation device 50 that is structured and arranged to: receive data from the LBS component 20 identifying the location and type of an emergency vehicle 35 when the siren and/or emergency lights of the emergency vehicle 35 are activated; receive or determine a location of the vehicle 15, e.g., from the GPS system 40; determine the location of the emergency vehicle 35 with respect to the location of the vehicle 15, e.g., based on the received data from the LBS component 20 and the GPS system 40; and display the location and type of the emergency vehicle 35 with respect to the location of the vehicle 15 on a visual display. In implementations, the GPS-based navigation device 50 may be referred to as a GPS with Emergency Vehicle Detection (EVD).

Figure 2:
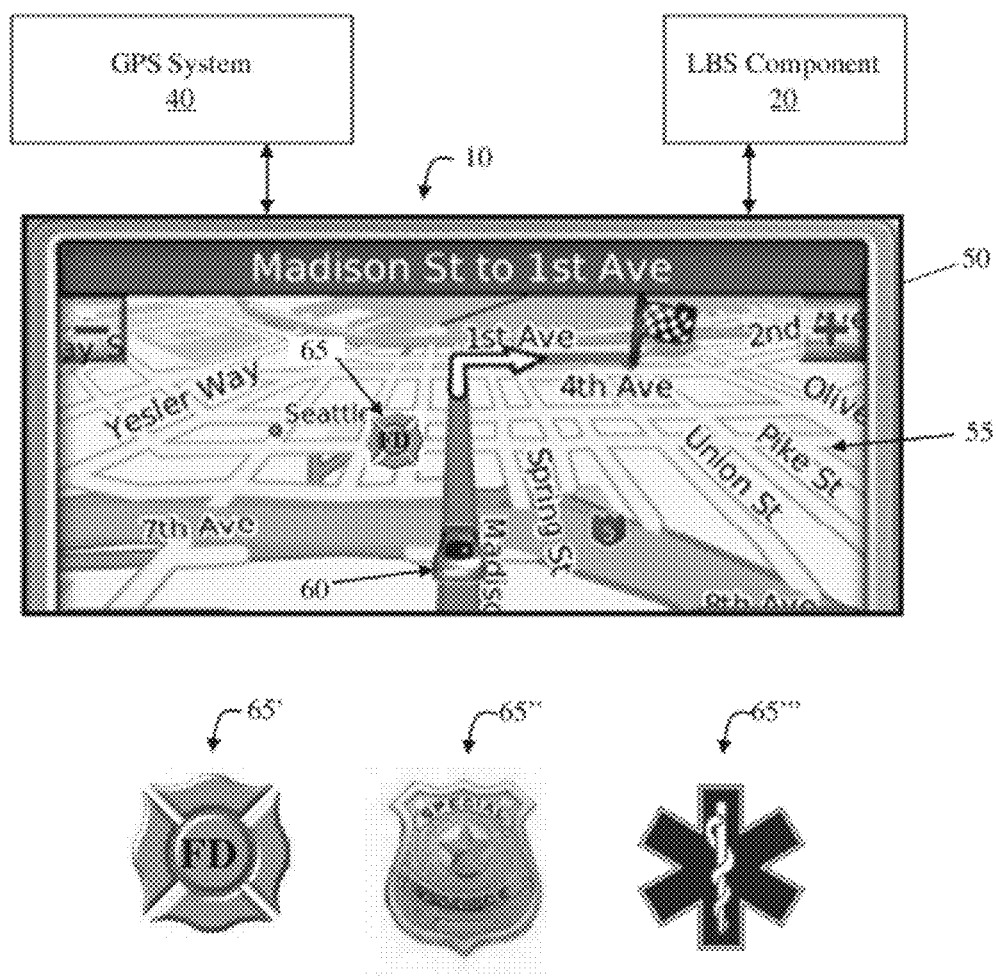
FIG. 2 shows an illustrative system in accordance with aspects of the invention.

Referring to FIG. 2, the GPS-based navigation device 50 receives data from the LBS component 20 and the GPS system 40 and, based on this data, displays a street map 55 including an icon 60 representing the vehicle 15 and another icon 65 representing the emergency vehicle 35. The icon 65 representing the emergency vehicle 35 may uniquely identify the emergency vehicle type (e.g., fire, police, ambulance, etc.) based on at least one of: shape, color, alphabetic character, numeric character, and blinking pattern. For example, the icon 65 may be representative of a fire department logo 65', a police logo 65", an ambulance logo 65''', or any other desired logo.

The GPS-based navigation device 50 may comprise a conventional GPS-based navigation device programmed with special purpose software that is configured to perform the processes described herein, or the GPS-based navigation device 50 may comprise a special purpose computing device configured to perform the processes described herein or combination thereof. The GPS-based navigation device 50 may comprise a portable unit (e.g., hand held, dashboard or windshield mounted, etc.), or may be integrated with the vehicle 15 (e.g., mounted in the dashboard, etc.). In even further embodiments, the GPS-based navigation device 50 may comprise a smart phone, personal digital assistant, tablet computer, or any other computing device having GPS capability and programmed with special purpose instructions configured to perform the processes described herein.

In implementations, the GPS-based navigation device 50 comprises a video display such as a liquid crystal display (LCD) or other suitable display component that is configured to display the street map 55, icon 60 representing the vehicle, and icon 65 representing the emergency vehicle. The GPS-based navigation device 50 may further store data and/or receive data, e.g., from GPS system 40, that defines the street map 55.

Figure 3:
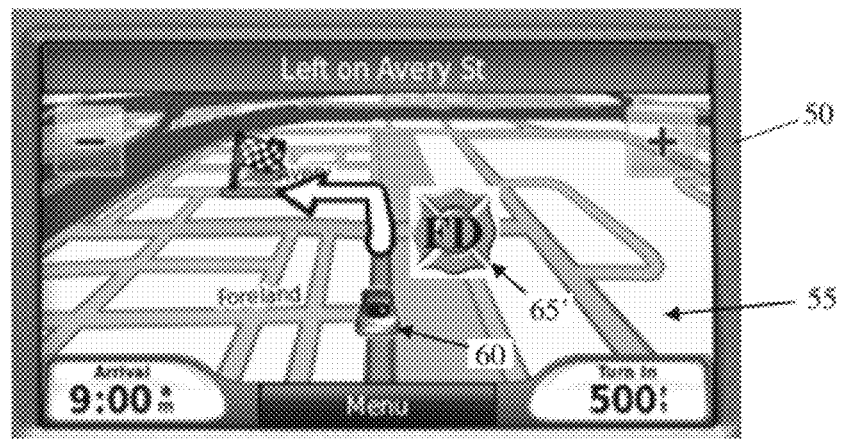
FIGS. 3-6 show illustrative examples of a navigation device displaying the location of an emergency vehicle relative to the location of a vehicle in accordance with aspects of the invention.
Figure 4:
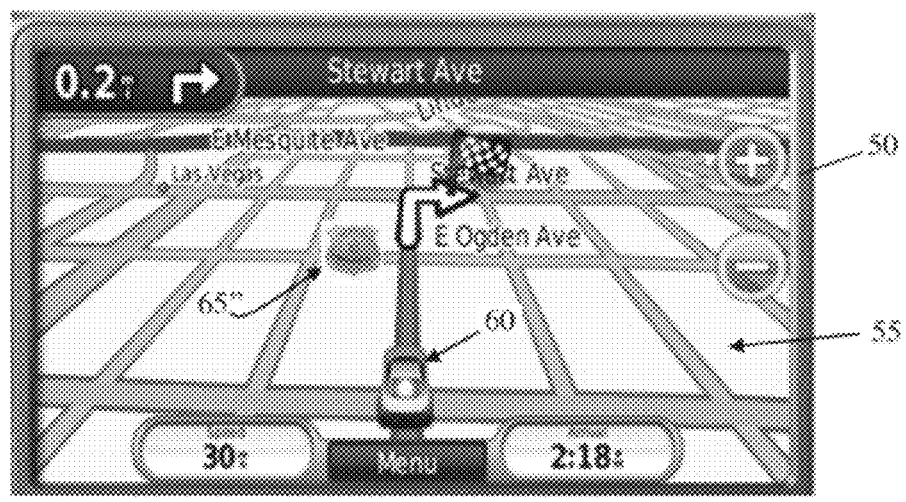
Figure 5:
Figure 6:
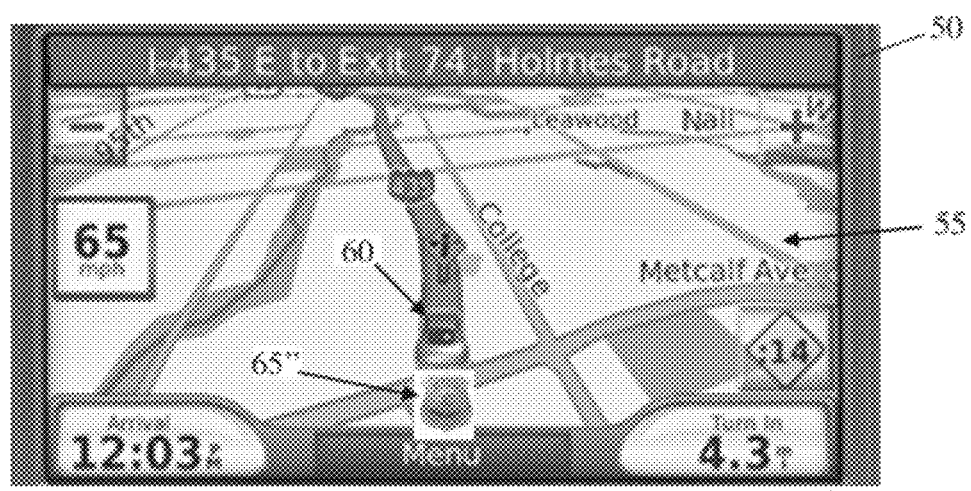

FIGS. 3-6 show illustrative examples of the GPS-based navigation device 50 displaying the location of an emergency vehicle relative to the location of the vehicle associated with the GPS-based navigation device 50. For example, FIG. 3 shows the GPS-based navigation device 50 displaying a street map 55, an icon 60 representing the driver's vehicle, and an icon 65' representing a fire truck approaching an upcoming intersection from the right. As another example, FIG. 4 shows the GPS-based navigation device 50 displaying a street map 55, an icon 60 representing the driver's vehicle, and an icon 65" representing a police car approaching an upcoming intersection from the left. In an even further example, FIG. 5 shows the GPS-based navigation device 50 displaying a street map 55, an icon 60 representing the driver's vehicle, and a plural icons 65', 65" and 65''' representing plural emergency vehicles ahead on the road. In yet another example, FIG. 6 shows the GPS-based navigation device 50 displaying a street map 55, an icon 60 representing the driver's vehicle, and an icon 65" representing a police car approaching from behind.

According to further aspects of the invention, the LBS component 20 (described with respect to FIG. 1) collects the location of one or more emergency vehicles 35 that have the siren and/or emergency lights activated (e.g., are responding to calls) and provides Emergency Vehicle Notification (EVN) data of the one or more emergency vehicles 35 to one or more GPS-based navigation devices 50 of one or more vehicles 15. In embodiments, the EVN data comprises the location of the emergency vehicle 35 (e.g., longitude and latitude) and the type of the emergency vehicle (e.g., police, fire, ambulance, etc.). In embodiments, the EVN data may also comprise identification data associated with the emergency vehicle 35, such as a vehicle identifier (e.g., ID number) normally displayed on the roof or other exterior portion of an emergency vehicle. In embodiments, the LBS component 20 continuously receives data from a transmitter 30 of an emergency vehicle 35 so long as the siren and/or emergency lights of the emergency vehicle are activated (e.g., the siren and/or emergency lights are on). The LBS component 20 may provide EVN data to the GPS-based navigation devices 50 through either a pull service or a push service, as described in greater detail herein. In implementations, the LBS component 20 may comprise a computer infrastructure that is at least one of created, maintained, deployed, supported, etc., by a service provider.

Figure 7:
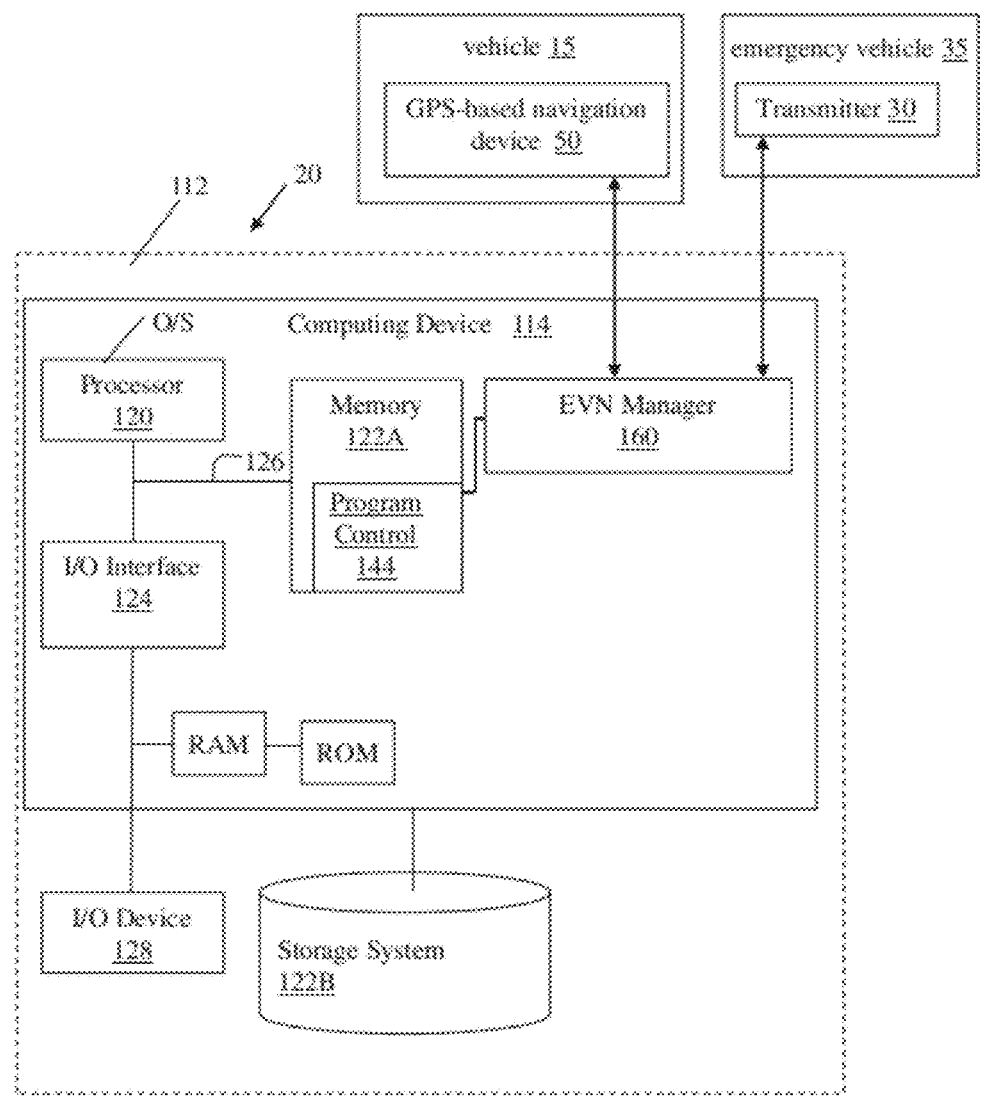
FIG. 7 shows an illustrative environment for implementing the steps in accordance with aspects of the invention.

FIG. 7 shows an illustrative environment for managing processes of the LBS component 20 in accordance with the invention. To this extent, the LBS component 20 may include a server or other computer infrastructure 112 that can perform one or more of the processes described herein. In particular, the computer infrastructure 112 includes a computing device 114. The computing device 114 can be resident on a network infrastructure or computing device of a third party service provider (any of which is generally represented in FIG. 7).

The computing device 114 also includes a processor 120, memory 122A, an I/O interface 124, and a bus 126. The memory 122A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 122A) may store business intelligence, data mining, regression analysis and/or modeling and simulation tools for execution by the processor 120.

The computing device 114 is in communication with the external I/O device/resource 128 and the storage system 122B. For example, the I/O device 128 can comprise any device that enables an individual to interact with the computing device 114 (e.g., user interface) or any device that enables the computing device 114 to communicate with one or more other computing devices using any type of communications link. The external I/O device/resource 128 may be for example, a handheld device, PDA, handset, keyboard etc.

In general, the processor 120 executes computer program code (e.g., program control 144), which can be stored in the memory 122A and/or storage system 122B. Moreover, in accordance with aspects of the invention, the program control 144 controls an EVN manager 160 that performs, e.g., the processes described herein. The EVN manager 160 can be implemented as one or more program code in the program control 144 stored in memory 122A as separate or combined modules. Additionally, the EVN manager 160 may be implemented as separate dedicated processors or a single or several processors to provide the function of these tools. While executing the computer program code, the processor 120 can read and/or write data to/from memory 122A, storage system 122B, and/or I/O interface 124. The program code executes the processes of the invention. The bus 126 provides a communications link between each of the components in the computing device 114.

Still referring to FIG. 7, in accordance with aspects of the invention, the EVN manager 160 is configured to communicate with one or more transmitters 30 to receive GPS location (e.g., longitude and latitude), vehicle type (e.g., police, fire, ambulance, etc.), and vehicle identifier (e.g., ID number) data. The EVN manager 160 is also configured to communicate with one or more navigation systems, e.g., comprising one or more GPS-based navigation devices 50, to provide EVN data to the one or more GPS-based navigation devices 50 using a push service or pull service method. The EVN manager 160 may communicate with the transmitters 30 and GPS-based navigation devices 50 using any suitable wireless communication protocol, including but not limited to cellular, Wi-Fi, WiMAX, or any other wireless transmission technique. The EVN manager 160 may provide EVN data identifying one or more emergency vehicles to one or more GPS-based navigation devices 50.

In further embodiments, the EVN manager 160 receives location data (e.g., longitude and latitude) of the vehicle 15 via the GPS-based navigation device 50, and determines a distance between an emergency vehicle 35 and the vehicle 15 by comparing the location data of the respective vehicles. In this manner, the EVN manager 160 transmits EVN data to the GPS-based navigation device 50 based on a determination that the vehicle 15 is within a predefined range of the emergency vehicle 35. The predefined range may be any desired range, including but not limited to a predefined number of blocks, feet, miles, meters, kilometers, etc. In implementations, the EVN manager 160 establishes a continuous communication connection with the GPS-based navigation device 50, or alternatively periodically receives updates from the GPS-based navigation device 50, in order to obtain the GPS location of the vehicle 15.

In embodiments, the EVN manager 160 is configured to use a default predefined range or to receive a user-defined predefined range from the GPS-based navigation device 50. For example, the programming of the GPS-based navigation device 50 may be configured to permit a user to set the predefined range, e.g., using an interactive options menu displayed as part of a graphical user interface. In this manner, different users of the vehicle 15 may set the predefined range to suit their preference. For example, a first driver may use the GPS-based navigation device 50 to set the predefined range to one mile when the first driver is operating the vehicle 15, and a second driver may use the GPS-based navigation device 50 to set the predefined range to 300 yards when the second driver is operating the vehicle 15. The GPS-based navigation device 50 transmits the user-selected predefined range to the EVN manager 160 for use by the EVN manager 160 in determining whether the vehicle 15 is within a predefined range of an emergency vehicle 35. When a user of the GPS-based navigation device 50 does not set the predefined range, the EVN manager 160 may be programmed to use a default predefined range, such as, for example, five miles. The invention is not limited to the values of predefined range described herein, and any suitable values may be set by one or more users, and any suitable values may be set as the default predefined range.

In embodiments, the EVN manager 160 provides EVN data to the GPS-based navigation device 50 using a pull service. When employing a pull service, the GPS-based navigation device 50 transmits the location of the vehicle 15 to the EVN manager 160 and a request that the EVN manager 160 provide EVN data for any emergency vehicles within the predefined range of the vehicle 15. The EVN manager 160 receives the location of the vehicle 15 and the request for EVN data, compares the location of the vehicle 15 to the location of all emergency vehicles 35 for which the EVN manager 160 is currently receiving data from a transmitter 30 as having an activated siren and/or emergency light, and returns EVN data to the GPS-based navigation device 50 identifying the location and type of emergency vehicle for all emergency vehicles that are within the predefined range of the vehicle 15 and which have at least one of a siren and emergency light activated. The GPS-based navigation device 50 then displays the location and type of the emergency vehicle(s), e.g., in the manner described with respect to FIGS. 2-6.

In additional embodiments, the EVN manager 160 provides EVN data to the GPS-based navigation device 50 using a push service. The push service is similar to the pull service with the exception that in the push service the EVN manager 160 sends EVN information to the GPS-based navigation device 50 without having first received a specific request from the GPS-based navigation device 50. For example, when employing a push service, the owner of the GPS-based navigation device 50 authorizes a substantially continuous connection between the EVN manager 160 and the GPS-based navigation device 50 so that the EVN manager 160 may obtain and update the location of the vehicle 15 comprising the GPS-based navigation device 50. Without receiving a specific request from the GPS-based navigation device 50, the EVN manager 160 automatically compares the location of the vehicle 15 to the location of all emergency vehicles 35 for which the EVN manager 160 is currently receiving data from a transmitter 30 as having an activated siren and/or emergency lights, and returns EVN data to the GPS-based navigation device 50 identifying the location and type of emergency vehicle for all emergency vehicles that are within the predefined range of the vehicle 15 and which have the siren and/or emergency lights activated. The GPS-based navigation device 50 then displays the location and type of the emergency vehicle(s), e.g., in the manner described with respect to FIGS. 2-6.

Still referring to FIG. 7, the computing device 114 can comprise any general purpose computing article of manufacture capable of executing computer program code installed thereon (e.g., a personal computer, server, etc.). However, it is understood that the computing device 114 is only representative of various possible equivalent-computing devices that may perform the processes described herein. To this extent, in embodiments, the functionality provided by the computing device 114 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 112 is only illustrative of various types of computer infrastructures for implementing the invention. For example, in embodiments, the computer infrastructure 112 comprises two or more computing devices (e.g., a server cluster) that communicate over any type of communications link, such as a network, a shared memory, or the like, to perform the process described herein.

Further, while performing the processes described herein, one or more computing devices on the computer infrastructure 112 can communicate with one or more other computing devices external to the computer infrastructure 112 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

According to further aspects of the invention, the transmitter 30 (described with respect to FIGS. 1 and 7) is configured to provide data to the LBS component 20 when the siren and/or emergency lights of an emergency vehicle are activated. In embodiments, the transmitter 30 is turned on when the siren and/or emergency lights are turned on, and the transmitter 30 is turned off when the siren and/or emergency lights are turned off. This may be accomplished using appropriate programming and/or wiring. In alternative embodiments, the transmitter 30 is always on and detects when the siren and/or emergency lights are turned on and off, e.g., by receiving a signal from the warning system of the emergency vehicle 35.

While the siren and/or emergency lights are on (e.g., activated), the transmitter 30 obtains or otherwise determines the location of the emergency vehicle. In embodiments, this is accomplished using GPS (e.g., GPS system 40), cellular network triangulation, or any other suitable location determination methodology.

While the siren and/or emergency lights are on (e.g., activated), the transmitter 30 also obtains or otherwise determines the type of the emergency vehicle, e.g., police, fire, ambulance, etc. In embodiments, this is accomplished in any suitable method, including but not limited to programming the transmitter with an identity of the particular emergency vehicle, programming the transmitter with a software application that detects the unique siren and/or emergency lights and associates the unique siren and/or emergency lights with a type of emergency vehicle, etc.

In accordance with aspects of the invention, the transmitter 30 continues transmitting the location data and type of emergency vehicle to the LBS component 20 for as long as at least one of the siren and emergency light is activated. In this manner, the transmitter 30 is configured to transmit such data to the LBS component 20 regardless of whether the emergency vehicle is moving or stationary. Accordingly, implementations of the invention may be used to provide EVN data to a vehicle 15 where the EVN data identifies both moving and stationary emergency vehicles 35.

The transmitter 30 transmits data to the LBS component 20, and in particular embodiments to the EVN manager 160 of the LBS component 20, using any suitable wireless communication protocol. For example, the transmitter 30 may have a unique type of radio frequency (RF) for sending signals to an LBS services center, or may exploit wireless services that use CDMA (code division multiple access), etc. Location Based Services (LBS) are known to include vehicle tracking services, such that further explanation is not believed necessary for understanding the invention.

In accordance with particular aspects of the invention, the transmitter 30 comprises a transmitter computing device comprising a local wireless transmitter (e.g., Bluetooth transmitter) that is integrated with, or operatively connected to, the siren and/or emergency lights system of the emergency vehicle 35. The transmitter 30 also comprises a smart phone mounted in or on the emergency vehicle 35. The transmitter computing device is configured to determine the location and type of the emergency vehicle 35 when the siren and/or emergency lights are activated, e.g., as already described herein. The transmitter computing device comprising the local wireless transmitter essentially operates inside the emergency vehicle 35 due to the small range, e.g., ten meters, of the local wireless transmitter. Accordingly, the transmitter computing device provides the location information and the type of vehicle to the smart phone, e.g., via message or signal using the local wireless communication, and the smart phone then relays this data to the LBS component 20 via the cellular network. In additional embodiments, the transmitter computing device may comprise any suitable transmitter that is hardwired to the smartphone, in which case the transmitter computing device provides the location information and the type of vehicle to the smart phone via message or signal using a wired connection. In further embodiments, the smartphone may comprise a conventional smartphone having special purpose software, or may comprise a special purpose smartphone designed for installation in emergency vehicles, e.g., without a need for video, camera, touch tone buttons, etc.

In additional embodiments of the invention, the transmitter 30 comprises a smart phone installed in or on the emergency vehicle 35, the smart phone being programmed with a software application (e.g., app) that detects the existence and type of an activated siren of the emergency vehicle 35. The audible signature of respective sirens may be unique to respective types of emergency vehicles. For example, a police vehicle may have a first unique siren, a fire vehicle may have a second unique siren, and an ambulance vehicle may have a third unique siren. The smart phone app may be programmed to recognize and differentiate between the various types of unique sirens. In this manner, when the siren in the emergency vehicle 35 is turned on, the smart phone detects the type of emergency vehicle 35 from the auditory signature of the siren. The smart phone also comprises a GPS component, e.g., communicating with GPS system 40, that determines the location of the emergency vehicle 35. Accordingly, when the siren of the emergency vehicle 35 is turned on, the smart phone determines the type of emergency vehicle 35 and the location and transmits this data to the LBS component 20. Although described herein with respect to emergency vehicles (e.g., police, fire, and ambulance vehicles), it is noted that aspects of the invention would be applied to any desired vehicle to identify the location of a first vehicle and provide this data to a vehicle for displaying the relative locations of the first and vehicles to an occupant of the vehicle.

In additional embodiments, the system may be configured to prevent transmission of EVN data to the GPS-based navigation device 50 in some situations, such as law enforcement road blocks, etc. For example, the transmitter 30 may be provided with or operatively connected to an override input device (e.g., button, toggle switch, touch screen, etc.) that permits an occupant of the emergency vehicle to selectively prevent the transmitter 30 from sending data to the LBS component 20. Additionally or alternatively, the EVN manager 160 of the LBS component 20 may be configured avoid sending EVN data to a GPS-based navigation device 50 when there are three or more police cars within a predefined small area, e.g., within twenty feet of one another.

Flow Diagrams

Figure 8:
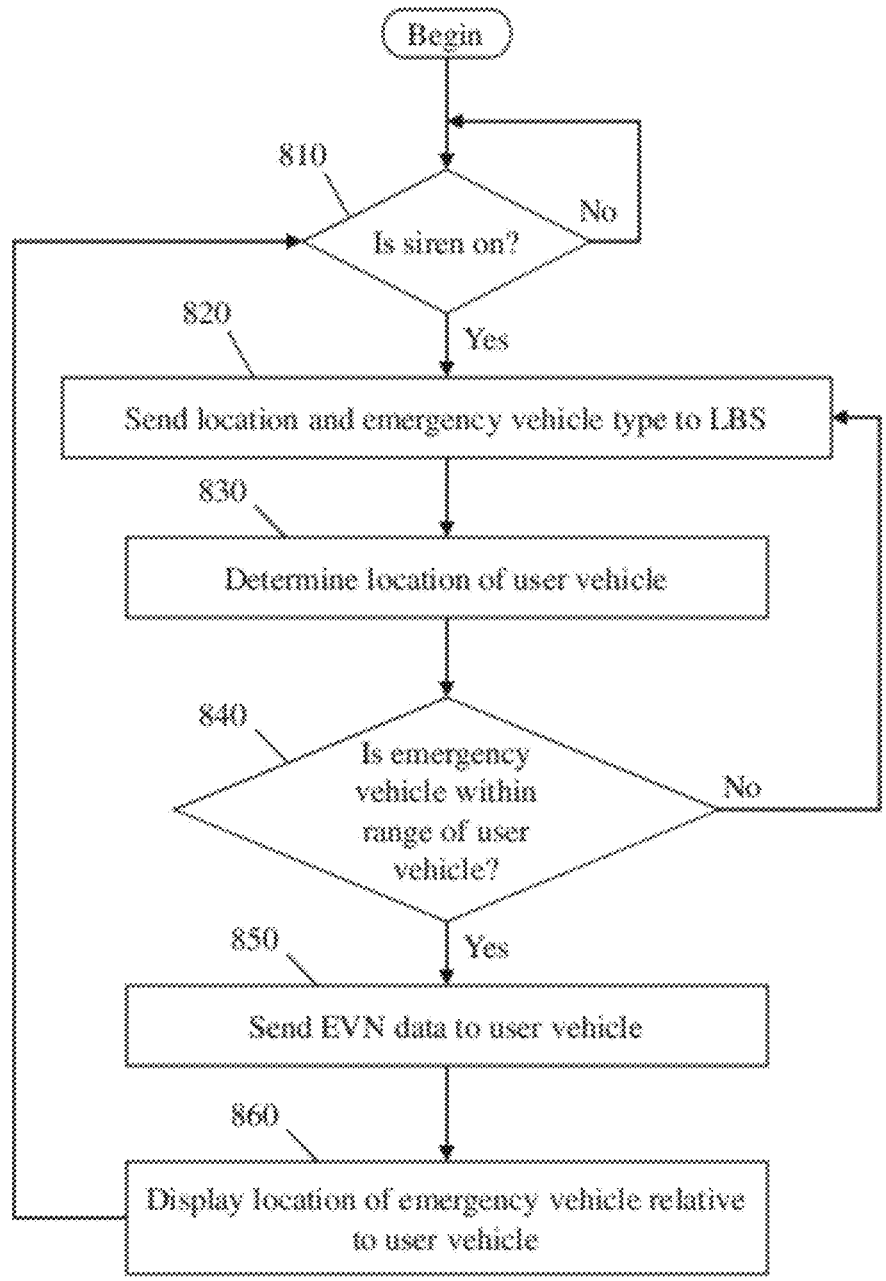
FIGS. 8 and 9 show exemplary flow/block diagrams in accordance with aspects of the invention.
Figure 9:
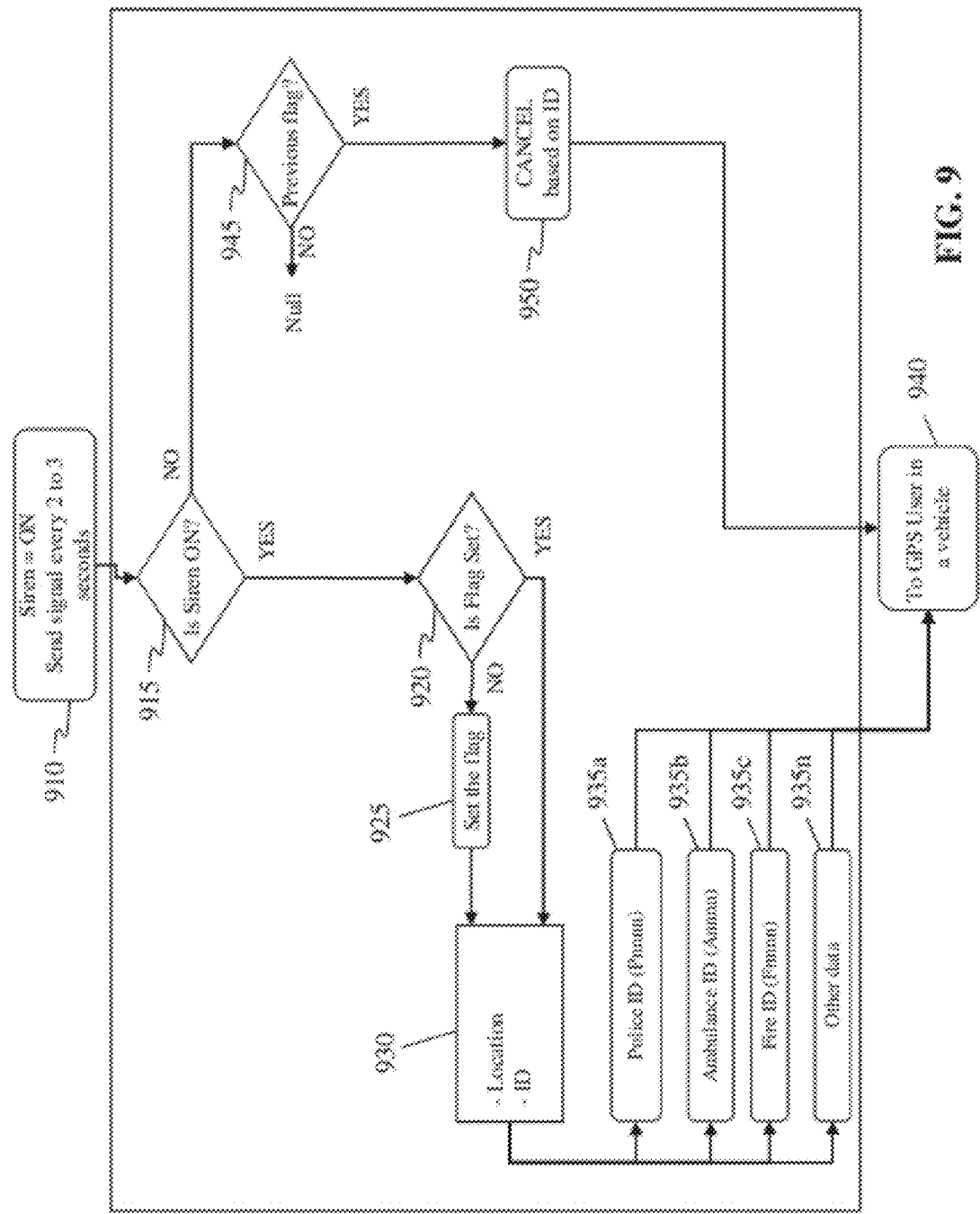

FIGS. 8 and 9 show exemplary flows for performing aspects of the present invention. The steps of FIGS. 8 and 9 may be implemented in the environment of FIGS. 1-7, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-7. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 8 depicts an exemplary flow for a process of providing early warning of emergency vehicles in accordance with aspects of the invention. At step 810, a transmitter associated with a first vehicle (e.g., an emergency vehicle 35) detects or determines that the warning system (e.g., at least one of a siren and emergency light) of the first vehicle is one of on (e.g., activated) or off (e.g., not activated). In embodiments, this is performed in the manner described above with respect to FIGS. 1-7.

When the determination at step 810 is negative, the process loops back to step 810, thus effectively waiting for the at least one of the siren and emergency light to be turned on. When the determination at step 810 is positive, then at step 820 the transmitter (e.g., transmitter 30) determines the location and type of the emergency vehicle and transmits this information to an LBS component (e.g., LBS component 20). At step 830, the LBS component obtains the location of one or more second vehicles (e.g., vehicles 15) in the manner described herein with respect to FIGS. 1-7. At step 840, the LBS component determines whether the emergency vehicle identified at step 820 is within a predefined range of one or more of the second vehicles identified at step 830. Step 840 may be performed, for example, by the LBS component determining a relative distance between the emergency vehicle and the second vehicle, and comparing the determined relative distance to the predefined range.

When the determination at step 840 is negative, the process returns to step 820 for updating the location of the emergency vehicle. When the determination at step 840 is positive, then at step 850 the LBS component transmits EVN data (e.g., the location and type of emergency vehicle) to the navigation system (e.g., GPS-based navigation device 50) of the second vehicle (e.g., vehicle 15). At step 860, the navigation system of the second vehicle displays the location of the emergency vehicle relative to the location of the second vehicle. The navigation system of the second vehicle also displays the type of emergency vehicle. Displaying the location and type of emergency vehicle may be performed as described above with respect to FIGS. 2-6. Following step 860, the process returns to step 810 to determine whether the at least one of the siren and emergency light in the emergency vehicle is still activated.

FIG. 9 shows an exemplary block diagram of a process of the LBS component receiving and signaling out the GPS location of an emergency vehicle when the emergency vehicle and GPS-enabled devices are in the range, in accordance with aspects of the invention. At block 910, the siren and/or emergency lights of an emergency vehicle are one of on (e.g., activated) or off (e.g., not activated). A transmitter (e.g., transmitter 30) associated with the emergency vehicle transmits data to the LBS component (e.g., LBS component 20) as already described herein. When the siren and/or emergency lights are on at block 915, then at block 920 the LBS component determines whether a flag for this emergency vehicle is set. If the flag is not set, then at block 925 the LBS component sets the flag.

At block 930, the LBS component determines the location and identification of the emergency vehicle from the data received from the transmitter. Blocks 935a-n represent categorization of the data associated with the emergency vehicle, such as Police, Ambulance, Fire, and Other (e.g., direction of travel, speed, etc.). Block 940 represents EVN data transmitted from the LBS component to the navigation system (e.g., GPS-based navigation device 50) of the vehicle. When the siren and/or emergency lights are off at block 915, then at block 945 the LBS component determines whether there exists a previous flag for this vehicle. If there is no previous flag at block 945, then there is no further action. On the other hand, if there is a previous flag at block 945, then at block 950 the process is canceled based on the emergency vehicle ID.

In embodiments, a service provider, such as a Solution Integrator, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system for warning of emergency vehicles, comprising:
    a computing device that receives location data from a transmitter associated with a first vehicle based on a warning system of the first vehicle being activated, wherein the computing device transmits vehicle notification data to a second vehicle based on the location data,
    wherein:
    the first vehicle comprises an emergency vehicle;
    the warning system comprises at least one of a siren and emergency light of the emergency vehicle;
    the vehicle notification data comprises emergency vehicle notification data;
    the computing device comprises a location based service (LBS) component;
    the computing device receives a request from the second vehicle; and
    the computing device transmits the emergency vehicle notification data to the second vehicle based on the request as part of a pull service.

2. The system of claim 1, wherein the computing device receives data indicating a type of the emergency vehicle with the location data.

3. The system of claim 2, wherein the emergency vehicle notification data comprises the location of the emergency vehicle and the type of the emergency vehicle.

4. The system of claim 3, wherein the computing device transmits the emergency vehicle notification data to a navigation system of the second vehicle.

5. The system of claim 4, wherein the navigation system is configured to display the location and type of the emergency vehicle relative to a location of the second vehicle on a map.

6. The system of claim 1, wherein the computing device receives a location of the second vehicle from the second vehicle.

7. The system of claim 6, wherein:
    the computing device determines a distance between the emergency vehicle and the second vehicle by comparing the location of the emergency vehicle to the location of the second vehicle;
    the computing device compares the determined distance to a predefined range to determine one of: the emergency vehicle is within the predefined range of the second vehicle, and the emergency vehicle is outside the predefined range of the second vehicle; and
    the computing device transmits the emergency vehicle notification data to the second vehicle based on the determining that the emergency vehicle is within the predefined range of the second vehicle.

8. A transmitter for warning of emergency vehicles, comprising:
    a wireless communication device associated with an emergency vehicle, wherein the wireless communication device transmits location data and type data to a location based services (LBS) component while at least one of a siren and emergency light of the emergency vehicle is activated,
    the type data comprises data identifying a type of the emergency vehicle, and
    the transmitter detects the type of the emergency vehicle based on an auditory signature of the siren of the emergency vehicle.

9. The transmitter of claim 8, wherein:
    the location data comprises a longitude and latitude location of the emergency vehicle.

10. The transmitter of claim 8, wherein the transmitter is structured and arranged such that one of:
    the wireless communication device is activated and deactivated automatically with the at least one of the siren and emergency light being activated and deactivated, respectively; and
    the wireless communication device detects the at least one of the siren and emergency light being activated.

11. The transmitter of claim 8, wherein:
    the transmitter further comprises a local wirelesses communication transmitter that detects the at least one of the siren and emergency light being activated and transmits a message to the wireless communication device; and
    the wireless communication device transmits the location data and type data to the LBS component using cellular communication based on receiving the message from the local wirelesses communication transmitter.

12. The transmitter of claim 8, wherein:
    the wireless communication device comprises a smart phone programmed with an application adapted to recognize and differentiate between types of sirens;
    the smart phone further comprises a GPS component that determines a location of the emergency vehicle; and
    the smart phone determines the location of the emergency vehicle and the type emergency vehicle based on the siren being turned on.

13. A method of warning of emergency vehicles, comprising:
    receiving location data and type data from an emergency vehicle based on at least one of a siren and emergency light of the emergency vehicle being activated; and
    transmitting emergency vehicle notification data to a vehicle based on the receiving the location data and type data,
    wherein the receiving and the transmitting are performed using a computing device,
    the location data comprises a longitude and latitude location of the emergency vehicle; and
    the type data comprises data identifying a type of the emergency vehicle,
    the transmitting the emergency vehicle notification data to the vehicle comprises transmitting the emergency vehicle notification data to a vehicle navigation system that is configured to display the type of the emergency vehicle and the location of the emergency vehicle relative to a location of the vehicle on a map, and
    the vehicle navigation system is configured to display a plurality of different icons for different types of emergency vehicles, wherein the plurality of different icons include a fire department logo, a police logo, and an ambulance logo.

14. The method of claim 13, further comprising:
receiving a location of the vehicle from the vehicle;
determining a distance between the emergency vehicle and the vehicle by comparing the location of the emergency vehicle to the location of the vehicle; and
comparing the determined distance to a predefined range to determine one of: the emergency vehicle is within the predefined range of the vehicle, and the emergency vehicle is outside the predefined range of the vehicle,
wherein the transmitting the emergency vehicle notification data to the vehicle is based on the determining that the emergency vehicle is within the predefined range of the vehicle.

15. The method of claim 14, wherein:
the computing device comprises a location based service (LBS) component;
the computing device receives a request from the vehicle; and
the computing device transmits the emergency vehicle notification data to the vehicle based on the request as part of a pull service.

16. The method of claim 14, wherein:
the computing device comprises a location based service (LBS) component; and
the computing device automatically transmits the emergency vehicle notification data to the vehicle as part of a push service without having received a specific request from the vehicle.

17. The method of claim 14, wherein the predefined range is a user selected predefined range.

18. The method of claim 17, further comprising receiving the user-selected predefined range from the vehicle.

19. The method of claim 13, further comprising receiving a vehicle identifier from the emergency vehicle.

* * * * *